(12) United States Patent
Yoshii et al.

(10) Patent No.: US 6,638,045 B2
(45) Date of Patent: Oct. 28, 2003

(54) DIE FOR MANUFACTURING RESIN PELLETS

(75) Inventors: Yasuo Yoshii, Takasago (JP); Shinichi Fukumizu, Takasago (JP); Osamu Ikeda, Takasago (JP); Nobuhiro Yamasaki, Takasago (JP); Yoshiaki Nakata, Takasago (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 0 days.

(21) Appl. No.: 09/740,918

(22) Filed: Dec. 21, 2000

(65) Prior Publication Data

US 2001/0005516 A1 Jun. 28, 2001

(51) Int. Cl.7 .......................... B29C 47/30; B29C 47/86
(52) U.S. Cl. ........................ 425/67; 425/313; 425/464
(58) Field of Search .................... 425/67, 313, 311, 425/382 R, 463, 464; 264/142

(56) References Cited

U.S. PATENT DOCUMENTS

| | | | |
|---|---|---|---|
| 3,323,170 A | * 6/1967 | Swickard, Jr. et al. | 425/310 |
| 3,461,495 A | * 8/1969 | Swickard et al. | 425/192 R |
| 3,599,286 A | 8/1971 | Karet | 425/464 |
| 3,857,665 A | * 12/1974 | Kennedy | 425/378 |
| 3,981,959 A | 9/1976 | Cuff | 264/142 |
| 4,378,964 A | * 4/1983 | Wolfe, Jr. | 246/142 |
| 4,856,974 A | * 8/1989 | Wolfe, Jr. | 425/67 |
| 4,934,916 A | * 6/1990 | Lambertus | 425/311 |
| 5,268,132 A | 12/1993 | Keilert et al. | 264/169 |
| 5,989,009 A | 11/1999 | Matsuo | 425/464 |

FOREIGN PATENT DOCUMENTS

| | | |
|---|---|---|
| DE | 40 36 196 | 5/1992 |
| DE | 196 38 994 | 3/1998 |
| DE | 198 11 089 | 10/1998 |
| WO | WO 98/13181 | 4/1998 |

* cited by examiner

Primary Examiner—James P. Mackey
Assistant Examiner—Thukhanh T. Nguyen
(74) Attorney, Agent, or Firm—Oblon, Spivak, McClelland, Maier & Neustadt, P.C.

(57) ABSTRACT

A die for manufacturing resin pellets capable of processing a die plate easily, and achieving simplification of a construction of heat channels and enhancement of heating efficiency. A die 1 for manufacturing resin pellets provided with a number of nozzle orifices 7 in the outer surface of the die, there are provided a plurality of rows of heat channels 8 which extend in a direction crossing the resin channels 5 in the vicinity of the outer surface of the die and are arranged along the resin channels 5. At least one of an introducing course and a discharging course for a heat medium in the plurality of heat channels 8.

15 Claims, 5 Drawing Sheets

COOLING WATER SIDE ← FLOW OF RESIN

FIG. 3

COOLING WATER SIDE ← FLOW OF RESIN

COOLING WATER SIDE

← FLOW OF RESIN

DIE FOR MANUFACTURING RESIN PELLETS

BACKGROUND OF THE INVENTION

1. Field of the Invention

The present invention relates to a die used with a resin-pellet manufacturing apparatus for manufacturing synthetic resin pellets, and more particularly to a die for manufacturing resin pellets provided with a heating means for heating a nozzle portion for extrusion of resins efficiently.

2. Description of the Prior Art

In the die used for the apparatus for manufacturing resin pellets of this kind, a heat channel for causing a heat medium to flow to heat the neighborhood of the nozzle is provided in a die plate in order to prevent the nozzle portion from being blocked up due to solidification of resins because the die surface is cooled by water. The typical prior art relating to the heat channel is disclosed in Japanese Patent Application Laid-Open No. Hei 1 (1989)-278312 Publication. The shape of a heat channel in the die plate is shown in FIG. 12.

Figure 12:
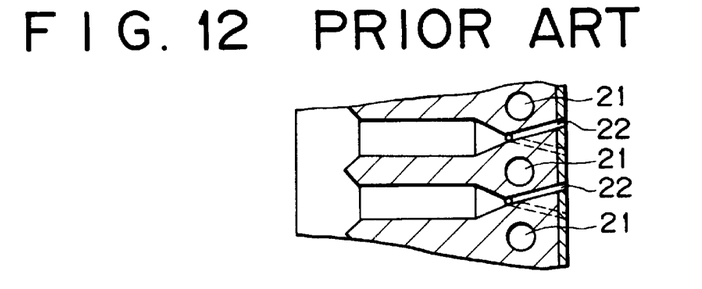
FIG. 12 is a sectional view corresponding to the sectional view shown in FIG. 3 of an example of a conventional die.
Figure 13:
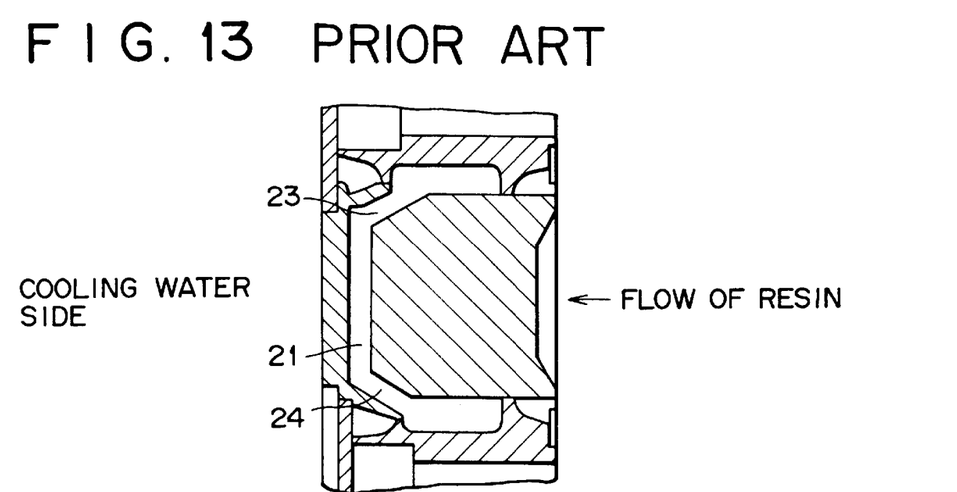
FIG. 13 is a sectional view corresponding to the sectional view shown in FIG. 2 of the die shown in FIG. 11.

Mostly, in the conventional die, a heat channels 21 is provided between adjacent nozzles 22, as shown in FIG. 12, and a sectional shape at right angles to the axis of the channel is a circular round hole. In such a round-hole shape, a heat transfer area is small relative to the opposed nozzles 22. Accordingly, if an attempt is made to improve the heating efficiency, the diameter of the round hole need be made large. Incidentally, in the case of the round-hole shape, drill processing is employed, and oblique processing is possible unlike discharge processing which is carried out in the case of the heat channel having a complicated sectional shape, because of which a channel 23 and a channel 24 on the introducing and discharging sides, respectively, of the heat medium with respect to the heat channel 21 can be processed by bending them obliquely as shown in FIG. 13. Accordingly, the heat channel 21 is made closer to the cooling water side (the left end side in FIG. 13) to enable minimizing the effect of water cooling.

However, in the heat channel 21 having a large-diameter round hole shape, the number of nozzle orifices through which resins flow becomes lessened, because of which a method is employed to branch it at the extreme end as shown in FIG. 12. However, the processing of the oblique nozzle orifices is so complicated that much time is taken, resulting in the rise of cost of the die plate.

Figure 14:
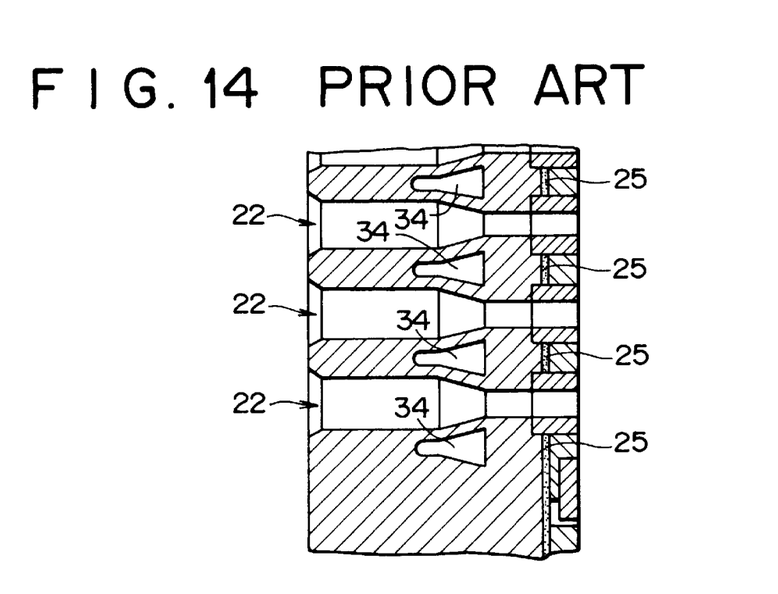
FIG. 14 is a sectional view corresponding to the sectional view shown in FIG. 3 of another example of the conventional die.

Separately from the above-described prior art, another example of typical prior art is disclosed in U.S. Pat. No. 4,752,196 Specification, a sectional view of the main parts of which is shown in FIG. 14. In this figure, reference numeral 22 designates a nozzle through which resin flows, and reference numeral 34 designates a heat channel, a sectional shape of which is a triangular shape corresponding to a large diameter and a small diameter of nozzles opposed to each other.

It is necessary for the processing such a complicated shaped heat channel 34 to carry it out over a long period of time using a electric discharge machine, resulting in posing a problem that brings forth high cost of a die plate and a longer period of delivery of products.

The present invention has been accomplished in order to overcome such problems as noted above with respect to prior art. An object of the present invention is to provide a die for manufacturing resin pellets capable of easily carrying out-processing of a die plate, of simplifying the construction of a heat channel, and of enhancing the heating efficiency.

SUMMARY OF THE INVENTION

For achieving the above-described object, the present invention provides the constructions mentioned below:

According to the present invention, there is provided a die for manufacturing resin pellets, comprising a row of heat channels comprising a plurality of nozzles forming resin channels and extending through a die to form nozzle orifices in the surface on a die water cooling surface side, and a plurality of heat channels, the row of heat channels being provided between said nozzles, and in the row of heat channels, the heat channels being arranged so as to be adjacent to and along the nozzles. Here, the heat channels can be extended in linear shape substantially parallel to the die water cooling surface side.

According to the present invention as described, there can be suitably used for a die provided with heat channels of a pelletizer of the under-water type or the ring water and hot cut type for manufacturing resin pellets. The provision of rows of a plurality of heat channels increases a heat transfer area and an improvement of heating efficiency.

Further, the die for manufacturing resin pellets according to the present invention comprises a heat medium introducing passage for forming a channel for guiding a heat medium into a die, and a heat medium discharging passage for forming a cannel for guiding the heat medium outside the die, the heat medium passage capable of being constructed so as to connect the heat medium introducing passage with the heat medium discharging passage. Further, there comprises a nozzle part ring formed with a nozzle, an outer die part provided on the outer peripheral side of the nozzle part ring, and an inner die part provided on the inner peripheral side of the nozzle part ring, an outer annular passage capable of being constructed between the outer die part and the nozzle part ring so that an inner annular page is formed between the inner die part and the nozzle part ring. Here, at least a part of at least one of the outer annular passage and the inner annular passage can be used as a heat medium introducing passage, and a part except the heat medium introducing passage can be used as a heat medium discharging passage. Alternatively, the outer annular passage may be divided into two passages in a circumferential direction so that one and the other may be used as a heat medium introducing passage and a heat medium discharging passage, respectively. Otherwise, one out of the outer annular passage and the inner annular passage may be used as a heat medium introducing passage, and the other may be used as a heat medium discharging passage. Further, preferably, in the row of heat channels, the heat channel closest to the die water cooling surface is provided at a position projected on the die water cooling surface with respect to the outer annular passage and the inner annular passage.

Further, alternatively, in the die for manufacturing resin pellets according to the present invention, at least one of the heat medium introducing passage and the heat medium discharging passage may be provided independently for each heat channel in the row of heat channels.

According to the present invention as described, since the flow rates of heat media in the plurality of rows of heat channels can be respectively adjusted according to the heat loads, a supply of heat to the heat channels is carried out in a well-balanced manner of heat by means of increasing the flow rate of the heat channel on the cooling water side or the like to thereby enable provision of a die with high heat efficiency.

Further, in the die for manufacturing resin pellets according to the present invention, the sectional shape of the heat channel at right angles to the axis of flow channel can be made circular. Here, preferably, the heat channel is provided so as to extend in the direction parallel with the surface on the die water cooling side.

According to the present invention as described, since the plurality of rows of heat channels can be formed by a drill processing to enable an oblique hole processing, whereby the heat channels can be made closer to the cooling water side, thus obtaining a die with high heat efficiency.

Further, in the die for manufacturing resin pellets according to the present invention, alternatively, in the row of heat channels, sectional areas of the heat channels at right angles to the axis of flow channel may vary. Here, preferably, the section of the heat channel at right angles to the axis of flow channel are made circular, and in the row of heat channels, the diameters of the heat channels vary, whereby the larger the sectional area of the nearby nozzle at the right angles to the axis of flow channel, the sectional area of the heat channel is made small.

According to the present invention as described, since the diameter of the channel can be changed adjusting to the arrangement of the nozzles, processing of an oblique nozzle orifice need not be carried out adjusting to the heat channel to enable provision of a high efficiency die at less cost.

Further, in the die for manufacturing resin pellets according to the present invention, alternatively, the ends of a part out of a plurality of heat channels constituting a row of heat channels may be closed to provide a heat insulating space. Here, preferably, the ends of the heat channel closest to the die water cooling surface is closed to provide a heat insulating space.

According to the present invention as described, in the case where the conditions of the heat medium as a utility is restricted, for example, in the case where the heat medium merely obtains a steam whose vapor pressure is low, and in the case where the steam cooled by being taken in heat on the cooling water side is condensed into drain to worsen the heating efficiency, and the heat medium merely obtains a relatively low temperature hot oil, the viscosity of oil cooled by being taken in heat on the cooling water side to thereby make it difficult to flow thus worsening the heating efficiency, whereas such a problem can be avoided under the simple construction.

Additional specific objects and advantages, residing in the details of construction and operation, will become apparent as the invention is more fully hereinafter described and claims.

DESCRIPTION OF THE PREFERRED EMBODIMENTS

The preferred embodiments of the present invention will be described in detail hereinafter with reference to the accompanying drawings.

Figure 1:
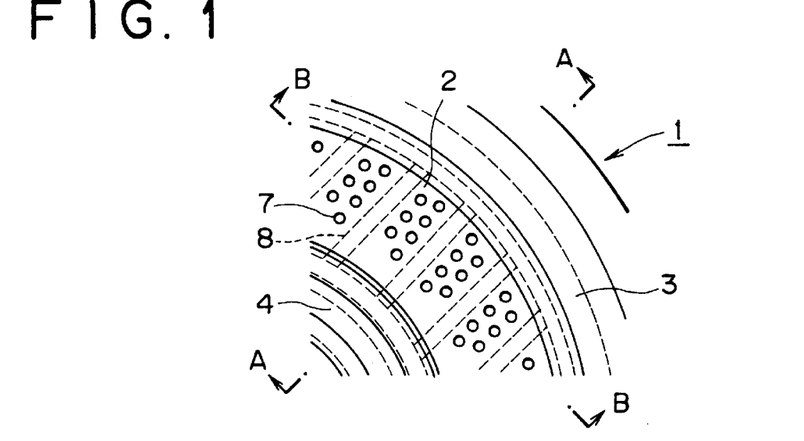
FIG. 1 is a fragmentary view of an outer end as viewed from a water chamber side of a die for manufacturing resin pellets according to a first embodiment of the present invention.
Figure 2:
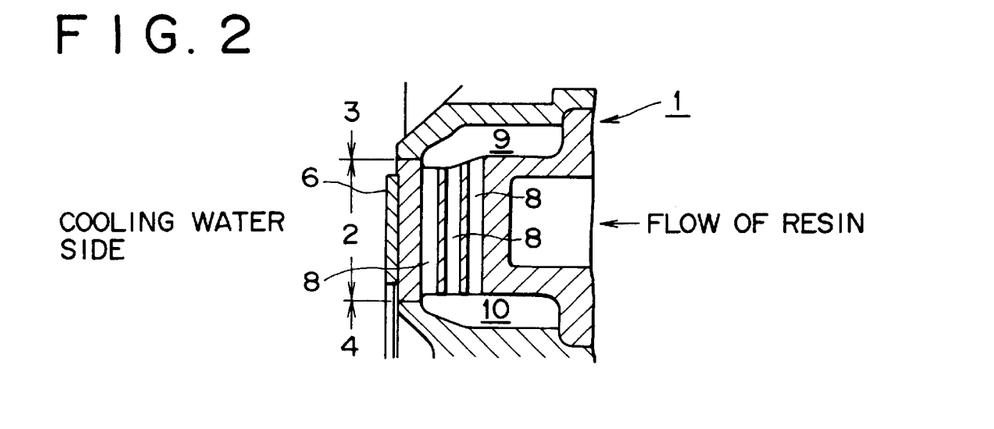
FIG. 2 is a sectional view taken along lines A-A in FIG. 1.

FIG. 1 is a fragmentary view of an outer end as viewed from a water chamber side of a die for manufacturing resin pellets according to a first embodiment of the present invention; FIG. 2 is a sectional view taken along line A—A in FIG. 1; and FIG. 3 is likewise a sectional view taken along line B—B in FIG. 1.

Figure 3:
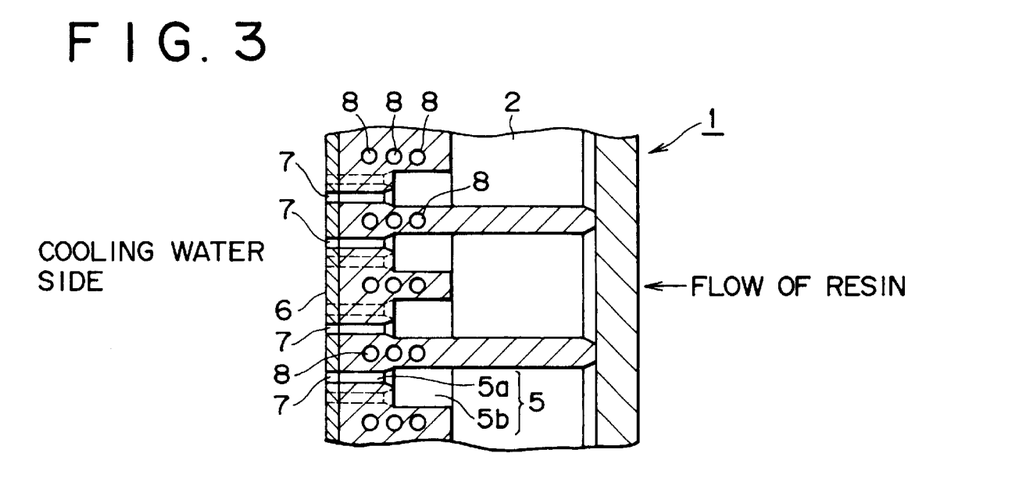
FIG. 3 is a sectional view taken along lines B-B in FIG. 1.

As shown in FIGS. 1 through 3, a die for manufacturing resin pellets according to a first embodiment of the present invention (hereinafter referred to as the die) 1 is disk-like in which a nozzle part ring 2, an outer die part (a flange part) 3 and an inner die part 4 provided externally and internally, respectively, with the ring 2 sandwiched therebetween, and is secured to the base body of a resin-pellet manufacturing apparatus (not shown) by means of a bolt which is inserted into a bolt hole not shown bored in the outer die part 3. The nozzle part ring 2 is formed with resin channels realized by a number of nozzles 5, 5, . . . extending through in a direction of the die axis.

The surface of the nozzle part ring 2 (the cutting surface against of which a cutter hits) is in the form of a flat surface crossing the die axis, the surface part being formed from a hard plate 6 excellent in abrasion resistance combined with the outer surface, the hard plate 6 being bored with nozzle orifices 7, 7, . . . at the tips of the nozzles 5, 5, . . . The nozzles 5, 5, . . . in the case of the present first embodiment are provided in the arrangement held parallel with the reference plane including the center axis of the ring in the nozzle part ring 2 (for example, the axial section along line A—A in FIG. 1) and in an equi-distant relation with each other. Each nozzle 5 is formed into a multi-cylindrical lip-shaped nozzle comprising a large-diameter passage 5b provided at a location on the side into which molten synthetic resin is fed, namely, on the back side away from the surface, and a plurality (for example, seven) of small-diameter passages 5a branched in a line-column arrangement while maintaining a parallelism from the large-diameter passage 5b and provided in communication with the nozzle orifices 7 at a location in the vicinity of the outer surface of the die.

The die 1 is provided with a heating means as a constitutional elemental member which featurizes the present invention. The heating means is constituted by an outer annular passage 9 and an inner annular passage 10 provided in the outer peripheral surface and the inner peripheral surface, respectively, of the nozzle part ring 2, and by a number of heat channels (HC) 8 to provide a connection between both the annular passages 9 and 10.

The outer annular passage 9 is of a well-known construction, which is therefore not shown in detail, and is divided into an upper semicircular annular passage and a lower semicircular annular passage, which respectively form an independent fluid chamber. A heating fluid inlet and a heating fluid outlet are provided in the upper semicircular annular passage and the lower semicircular annular passage, respectively.

In the heating means as described, the heating fluid such as steam introduced from the heating fluid inlet forms a flow following the flowing course in which the fluid flows from the upper semicircular annular passage of the outer annular passage 9 to a number of upper half heat channels 8, 8, . . . to arrive at the inner annular passage 10, and further flows through a number of lower half heat channels 8, 8, . . . and is discharged via the heating fluid outlet from the lower semicircular annular passage of the outer annular passage 9, to heat the nozzles 5, 5, . . . portions during the passage. Alternatively, the heating means may employ a constitution in which both the outer annular passage 9 and the inner annular passage 10 are formed into a totally annular configuration so that the whole heat channels 8 are connected in parallel between both the passages 9 and 10, and the heating fluid inlet and the heating fluid outlet are provided in one of both the passages 9 and 10 and in the other, respectively.

The heat channels 8 as shown in FIG. 2 and FIG. 3 in the heating means extend in a direction crossing the portion in the vicinity of the outer surface of the die in communication with the nozzle orifices 7 in the nozzles 5, 5, . . . and are provided in arrangement along the nozzles 5. In the heat channels 8 in case of the present first embodiment, a plurality of heat channels 8 are provided in a row between the nozzles 5, 5 adjacent to each other. For example, in FIGS. 1 through 3, three heat channels 8 form one row. The individual heat channels 8 extend in a direction parallel with the outer surface of the die. In each row, a direction in which the heat channels 8 line is the direction vertical to the outer surface of the die. The spacing between the heat channels 8 in each row is equi-distant. While in FIGS. 1 through 3, one row of the heat channels 8 is provided between the nozzles 5, 5 adjacent to each other, it is noted that a plurality of rows of heat channels 8 may be provided between the nozzles 5, 5 adjacent to each other. And each heat channel 8 is formed into a linear channel with a section at right angles to the axis of the channel being a round-shape of the same diameter.

In the heating means constructed as described above, since a plurality of rows of the heat channels 8 is provided close to the each of nozzles 5, the heat efficiency is improved in combination of an increase in heat transfer area and a high heat transfer rate. Further, being a round hole, the simple process by way of drill processing can be employed.

Figure 4:
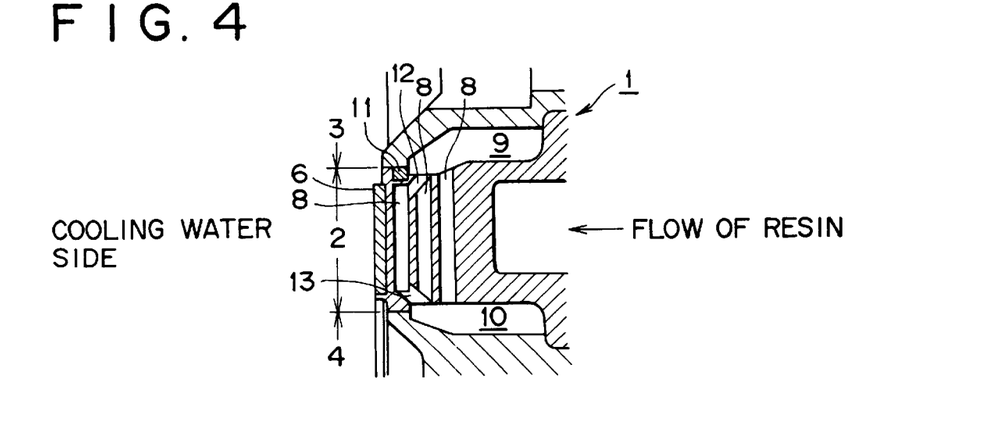
FIG. 4 is a sectional view corresponding to the sectional view shown in FIG. 2 of a die according to a second embodiment of the present invention.
Figure 5:
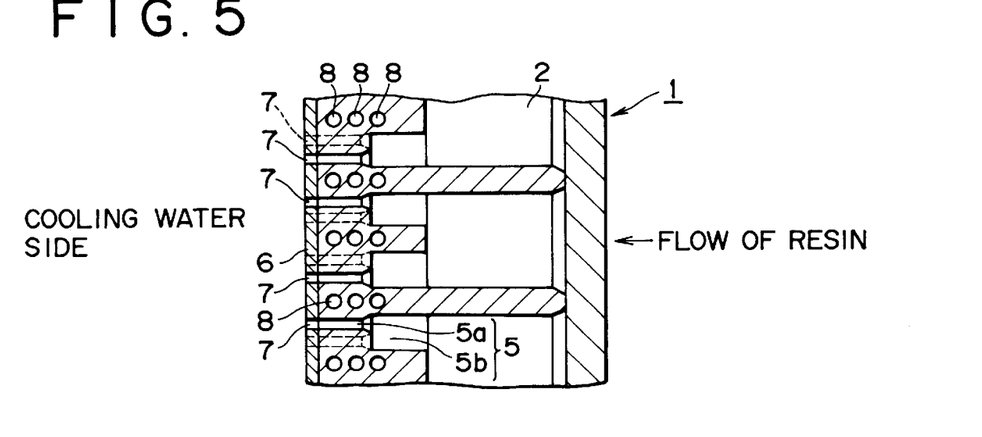
FIG. 5 is a sectional view corresponding to the sectional view shown in FIG. 3 of the die shown in FIG. 4.

FIG. 4 is a sectional view corresponding to the sectional view shown in FIG. 2 of the principal construction of a die according to a second embodiment of the present invention; and FIG. 5 is likewise a sectional view corresponding to the sectional view shown in FIG. 3 of the die.

The die according to the second embodiment is similar in construction to the die according to the aforementioned first embodiment, in which the same reference numerals as those used in the first embodiment are attached to the corresponding members, detailed description of which are omitted.

With respect to the die according to the second embodiment, there are two constitutional characteristics; one is that each heat channel 8 is formed to be a circular linear channel, and the other is that a plurality of rows of heat channels 8 in each line is provided at a location as close to the outer surface of the die as possible, that is, the surface on the water chamber side.

In this case, the heat channels 8 in the front row closest to the outer surface of the die are bored in the surface portion of the nozzle part ring 2 from the peripheral edge by a drill processing, and a plug 11 seals an open part whereby heat channels can be formed simply. Since the heat channels 8 in the front row are at a position projected forward relative to the outer annular passage 9 and the inner annular passage 10, they cannot be communicated with both the passages 9 and 10 as they are. So, the heat channel inlet 12 and the heat channel outlet 13 are subjected to processing for an oblique round hole by way of a drill processing at a required location of the nozzle part ring 2, as shown in FIG. 4, to thereby enable establishment of communication between the heat channels 8 in the front row and both the passages 9 and 10. A plurality of rows of heat channels 8 is provide at a location close to the outer surface of the die as described above, to thereby provide a die with high heating efficiency easily.

Figure 6:
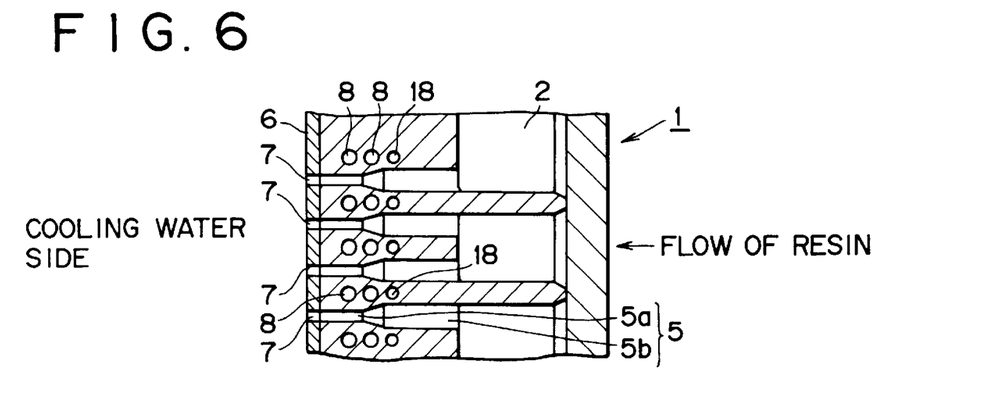
FIG. 6 is a sectional view corresponding to the sectional view shown in FIG. 3 of a die according to a third embodiment of the present invention.

FIG. 6 is a sectional view corresponding to the sectional view shown in FIG. 3 of a die according to a third embodiment of the present invention;

The die according to the third embodiment is similar in construction to the die according to the aforementioned first embodiment, in which the same reference numerals as those used in the first embodiment are attached to the corresponding members, detailed description of which are omitted.

With regard to the die according to the third embodiment, there are two constitutional characteristics; one is that the heat channel 8 is formed to be a circular linear channel, and the other is that heat channels 8 in each row are changed in the diameter of channel according to that of the nozzle 5 to which each heat channel 8 is opposite. That is, a heat channel 18 (on the right end in FIG. 6) close to a large-diameter passage 5b side of the nozzle 5 is formed to be a small-diameter circular linear channel, and the other heat channel 8 close to a small-diameter passage 5a side is formed to be a large-diameter circular linear channel.

By the provision of such a constitution, the diameter of the heat channel is changed adjusting to the arrangement of the nozzle 5 to enable adjustment of the flow rate of the heat medium. It is not necessary to apply a processing for an oblique nozzle orifice adjusting to a heat channel, unlike prior art in which the diameter of a single row of heat channels is increased, thus making it possible to provide a die with high heating efficiency with a simple construction.

Figure 7:
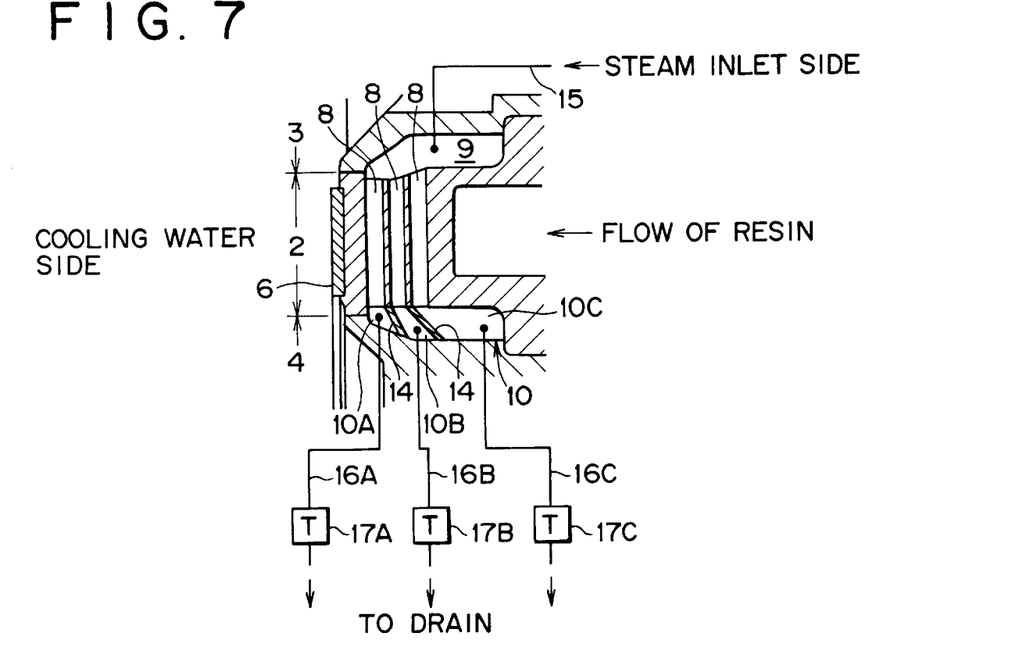
FIG. 7 is a sectional view corresponding to the sectional view shown in FIG. 2 of a die jointly showing a heat channel system according to a fourth embodiment of the present invention.

FIG. 7 is a sectional view corresponding to the sectional view shown in FIG. 2 of a die jointly showing a heat channel system according to a fourth embodiment of the present invention;

The die according to the fourth embodiment is similar in construction to the die according to the aforementioned first embodiment, in which the same reference numerals as those used in the first embodiment are attached to the corresponding members, detailed description of which are omitted.

With regard to the die according to the fourth embodiment, there is a constitutional characteristic that discharge courses for a heat medium are provided independently for heat channels 8 in each row. In the case of this embodiment, two partitioning walls 14 in the shape of a ring are used to divide the inner annular passage 10 into three passages to thereby form a front passage 10A, a middle passage 10B, and a rear passage 10C which are brought into communication with the heat channels 8 in each row; a heat medium inlet pipe 15 is connected to the outer annular passage 9; heat medium outlet pipes 16A, 16B, and 16C are connected to the three passages 10A, 10B, and 10C, respectively; and where for example, high pressure steam is used as the heat medium, steam traps 17A, 17B, and 17C are provided on the heat medium outlet pipes 16A, 16B, and 16C, respectively, to thereby constitute a required heat channel system.

By the provision of such a constitution, the heat channels 8 in each row are adjusted in heating ability according to heat loads. In general, the heat channel 8 close to the water chamber side tends to be cooled. Therefore, where the heat medium comprises steam, it has a tendency that drain tends to be stayed in the heat channel. Accordingly, the discharge course is divided as described above to thereby further improve a supply of heat to the heat channel, thus providing a die with high heating efficiency. Further, where the heat medium comprises oil or the like instead of steam, the heat medium courses including the outer annular passage 9 in communication with a plurality of rows of heat channels 8 may be provided independently every row.

Figure 8:
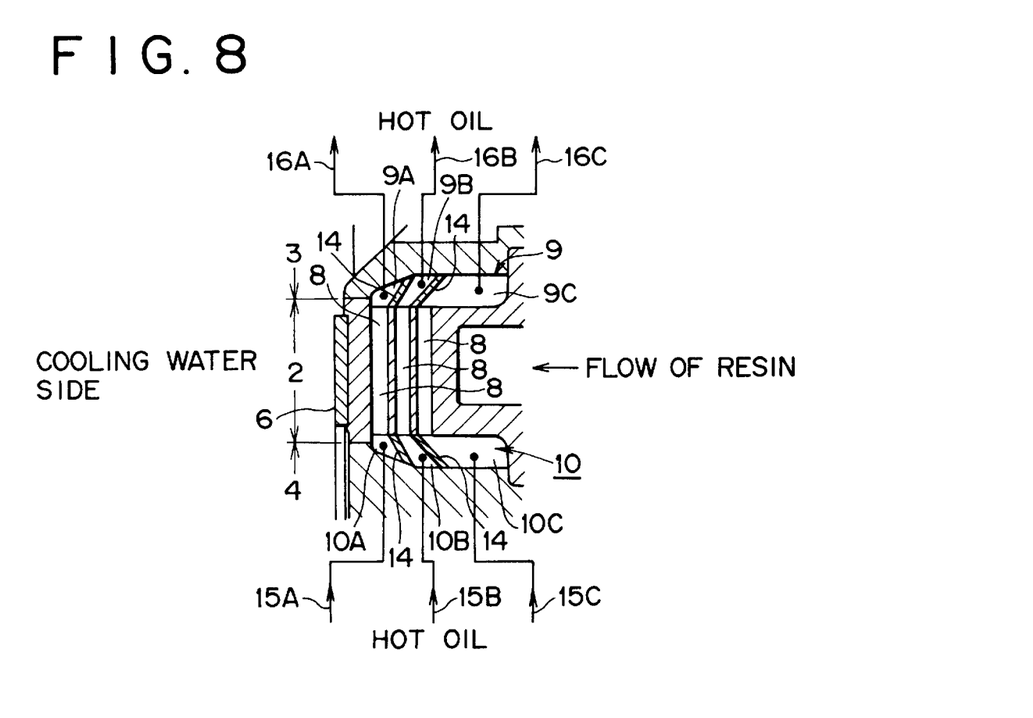
FIG. 8 is a sectional view corresponding to the sectional view shown in FIG. 2 of a die jointly showing a heat channel system according to a fifth embodiment of the present invention.

FIG. 8 is a sectional view corresponding to the sectional view shown in FIG. 2 of a die jointly showing a heat channel system according to a fifth embodiment of the present invention;

The die according to the fifth embodiment is similar in construction to the die according to the aforementioned fourth embodiment, in which the same reference numerals as those used in the fourth embodiment are attached to the corresponding members.

With regard to the die according to the fifth embodiment, there is a constitutional characteristic that both inlet courses and discharge courses for a heat medium in a plurality of rows of heat channels 8 are provided independently in each row. In the case of this embodiment, two partitioning walls 14 in the shape of a ring are used to divide the outer annular passage 9 and the inner annular passage 10 into three passages to thereby form front passages 9A, 10A, middle passages 9B, 10B, and rear passages 9C, 10C which are brought into communication with the heat channels 8 in each row; heat medium inlet pipes 15A, 15B, 15C are connected to the three passages 10A, 10B, 10C; and heat medium outlet pipes 16A, 16B, 16C are connected to the three passages 9A, 9B, and 9C, respectively, to thereby constitute a required heat channel system.

According to the embodiment constructed as described above, there is provided a die suitably used for a fluid that is free from a change in phase such as heated oil as a heat medium. The channels are provided independently whereby the flow rates of the heat channels 8 can be separately adjusted according to various cooling conditions such that the heat channel 8 close to the water chamber side tends to be cooled, and the supply of heat to the heat channels 8 is further improved to provide a die with high heating efficiency.

Figure 9:
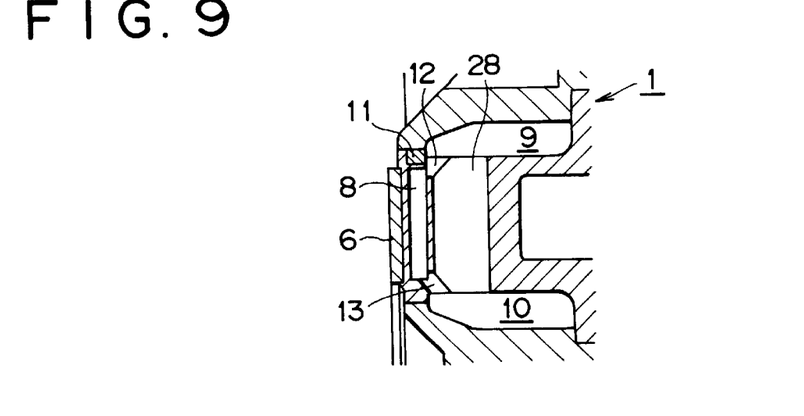
FIG. 9 is a sectional view corresponding to the sectional view shown in FIG. 2 of a die according to a sixth embodiment of the present invention.
Figure 10:
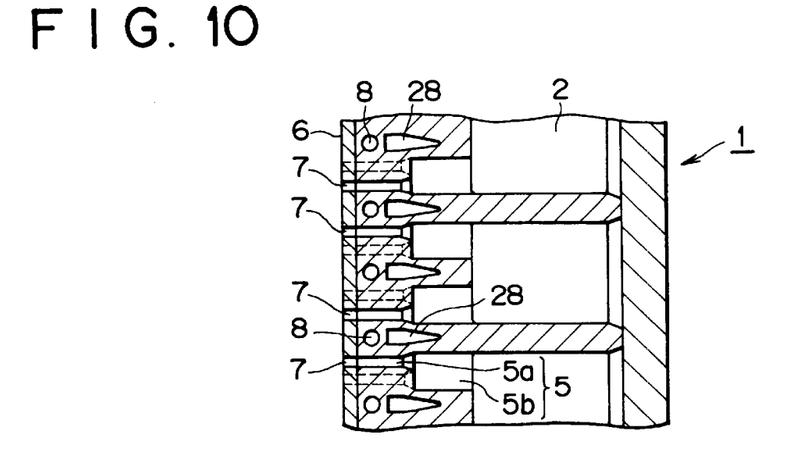
FIG. 10 is a sectional view corresponding to the sectional view shown in FIG. 3 of the die shown in FIG. 9.

FIG. 9 is a sectional view corresponding to the sectional view shown in FIG. 2 of a die according to a sixth embodiment of the present invention; and FIG. 10 is likewise a sectional view corresponding to the sectional view shown in FIG. 3.

The die according to the sixth embodiment is similar in construction to the die according to the aforementioned second embodiment (see FIGS. 4 and 5), in which the same reference numerals as those used in the second embodiment are attached to the corresponding members.

With regard to the die according to the fifth embodiment, there are constitutional characteristics that a plurality of rows of heat channels is provided at a location as close to the outer surface of the die as possible, that is, the surface on the water chamber side, and that a plurality of rows of heat channels comprises a combination of heat channels 8 in the front row side formed into a circular (in section) linear channel and heat channels 28 on the rear row side formed into a linear channel in pentagonal shape in section as shown in FIG. 10.

In the case of the die according to the embodiment having the constitution as described above, a electric discharge machining is necessary for processing the heat channels 28, and the rise of cost in the manufacture is not avoidable as compared with the dies according to the first to fifth embodiments, but the point that can be obtained a die with high heating efficiency is excellent. In this case, the heat channels 8 in the water cooling surface side are formed into a circular (in section) linear channel whereby boring of the heat channel inlet 12 and the heat channel outlet 13 by way of an oblique hole processing using a drill can be accomplished relatively easily to thereby enable the disposition of the heat channels at a location close to the cooling water chamber side as a whole. Thereby, a die with high heating efficiency capable of holding a temperature of the nozzle wall high can be realized. Needless to say, with respect to the heat channels 28 combined with the heat channels 8 formed into a circular (in section) linear channel, that is not limited to the pentagonal shape but the square shape may be also employed.

Figure 11:
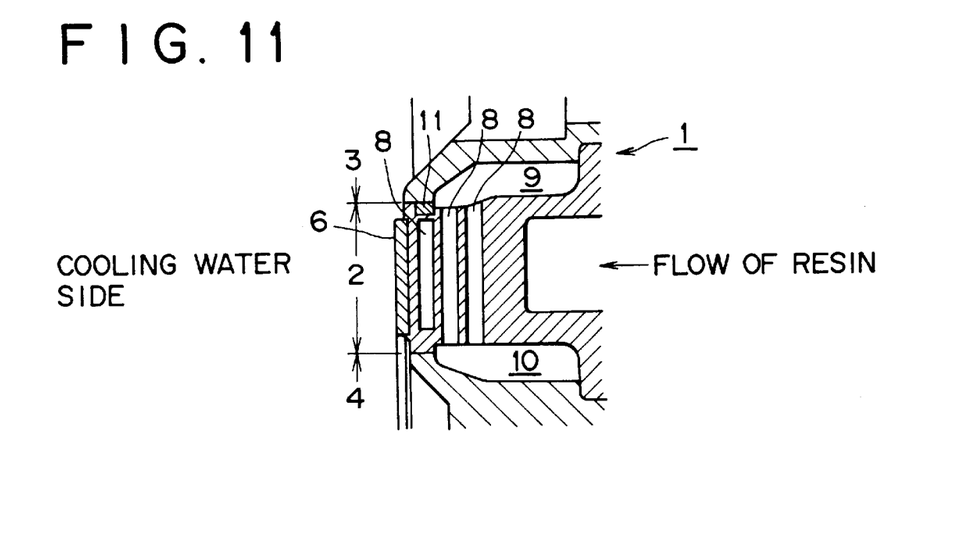
FIG. 11 is a sectional view corresponding to the sectional view shown in FIG. 2 of a die according to a seventh embodiment of the present invention.

FIG. 11 is a sectional view corresponding to the sectional view shown in FIG. 2 of a die according to a seventh embodiment of the present invention.

The die according to the seventh embodiment is similar in construction to the die according to the aforementioned second embodiment, in which the same reference numerals as those used in the second embodiment are attached to the corresponding members, detailed description of which are omitted.

With regard to the die according to the seventh embodiment, there are two constitutional characteristics; one is that the heat channels 8 are formed into a circular linear channel which is easy in drill processing and are provided at a location as close to the outer surface of the die as possible, that is, the surface of the water chamber, and the other is that at least the heat channel 8 closest to the outer surface of the die (in FIG. 11, one in the leftmost) are formed in an independent heat insulating space.

The means for forming the heat insulating space for the heat channels 8 including one closest to the outer surface of the die comprises, for example, boring a closed-end round hole in the nozzle part ring 2 by the drill processing, and closing the open end at the end thereof by a plug 11 whereby the heat channels 8 provided with a heat insulating space can be formed simply. In this case, a means for making it difficult to transmit heat, such that air or a heat insulating material is sealed into the closed-end round hole, is applied, after which the end is closed to provide a heat insulating space as intended.

In the case of the die according to the embodiment having the constitution as described above, the heat channels 8 on the cooling water side is sometimes deteriorated in heating efficiency under the influence of cooling water depending on the kind of the heat medium to be used as described previously, whereas that can be avoided positively under the simple construction.

What is claimed is:

1. A die for manufacturing resin pellets, comprising:
   a plurality of nozzles for forming resin channels, said nozzles extending through a die to form nozzle orifices in the surface on a die water cooling surface; and
   a row of heat channels comprising at least three individual heat channels extending parallel to the die water cooling surface and equidistantly spaced from one another in a direction normal to the die water cooling surface, said row of heat channels being provided between said nozzles,
   wherein in said row of heat channels, heat channels being arranged adjacent to said nozzles and along nozzles.

2. The die for manufacturing resin pellets according to claim 1, wherein said heat channels are linear.

3. The die for manufacturing resin pellets according to claim 1, further comprising:
   a heat medium introducing passage for forming a channel for guiding a heat medium into the die; and
   a heat medium discharging passage for forming a channel for guiding a heat medium outside the die,
   wherein said heat channels connect said heat medium introducing passage with said heat medium discharging passage.

4. The die for manufacturing resin pellets according to claim 3, further comprising:
   a nozzle part ring formed with said nozzles;
   an outer die part provided on the outer peripheral side of said nozzle part ring, an outer annular passage being formed between said outer die part and said nozzle ring; and
   an inner die part provided on the inner peripheral side of said nozzle part ring, an inner annular passage being formed between said inner die part and said nozzle part ring,
   wherein at least a part of at least one of said outer annular passage and said inner annular passage is used as said heat medium introducing passage, and a portion except said heat medium introducing passage of said outer annular passage and said inner annular passage is used as said heat medium discharging passage.

5. The die for manufacturing resin pellets according to claim 4, wherein said outer annular passage is divided into two passages in a circumferential direction so that one and the other thereof are used as said heat medium introducing passage and said heat medium discharging passage, respectively.

6. The die for manufacturing resin pellets according to claim 4, wherein one out of said outer annular passage and said inner annular passage is used as said heat medium introducing passage, and the other is used as said heat medium discharging passage.

7. The die for manufacturing resin pellets according to claim 1, wherein a sectional shape in a direction at right angles to a length of the flow channel of each of said heat channels is circular.

8. The die for manufacturing resin pellets according to claim 1, wherein in said row of heat channels, sectional areas at right angles to the axis of flow channel of the heat channels vary.

9. The die for manufacturing resin pellets according to claim 8 wherein a section at right angles to the axis of channel of the heat channels is circular, and in said row of heat channels, the diameters of the heat channels vary.

10. The die for manufacturing resin pellets according to claim 8 wherein a sectional area of a heat channel varies in size inversely to a sectional area of a nozzle at right angles to the axis of flow of the heat channel.

11. The die for manufacturing resin pellets according to claim 3 wherein at least one of said heat medium introducing passage and said heat medium discharging passage is provided independently for each heat channel in said row of said heat channels.

12. The die for manufacturing resin pellets according to claim 11 wherein both said heat medium introducing passage and said heat medium discharging passage are provided independently for each heat channel in said row of said heat channels.

13. The die for manufacturing resin pellets according to claim 1 wherein in said row of heat channels, a sectional shape at right angles to the axis of flow channel closest to the die water cooling surface is circular.

14. The die for manufacturing resin pellets according to claim 1 wherein ends of a part out of said plurality of heat channels constituting said row of heat channels is closed to provide a heat insulating space.

15. The die for manufacturing resin pellets according to claim 1 wherein ends of the heat channel closest to said die water cooling surface provide a heat insulating space.

\* \* \* \* \*

UNITED STATES PATENT AND TRADEMARK OFFICE
CERTIFICATE OF CORRECTION

PATENT NO.     : 6,638,045 B2
DATED          : October 28, 2003
INVENTOR(S)    : Yoshii et al.

It is certified that error appears in the above-identified patent and that said Letters Patent is hereby corrected as shown below:

<u>Title page,</u>
Insert Item [30], Foreign Application Priority Data, as follows:
-- [30]          Foreign Application Priority Data
      Dec. 24, 1999   (JP) ........................... 11-367053 --

Signed and Sealed this

Twentieth Day of January, 2004

JON W. DUDAS
*Acting Director of the United States Patent and Trademark Office*